(12) United States Patent
Chen et al.

(10) Patent No.: US 11,614,812 B2
(45) Date of Patent: Mar. 28, 2023

(54) METHOD AND APPARATUS FOR PRESSURE DETECTION, ACTIVE PEN, TOUCH CONTROL CHIP, AND ELECTRONIC DEVICE

(71) Applicant: SHENZHEN GOODIX TECHNOLOGY CO., LTD., Guangdong (CN)

(72) Inventors: Xianpeng Chen, Guangdong (CN); Hai Li, Guangdong (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 58 days.

(21) Appl. No.: 17/487,294

(22) Filed: Sep. 28, 2021

(65) Prior Publication Data

US 2022/0011883 A1 Jan. 13, 2022

Related U.S. Application Data

(63) Continuation of application No. PCT/CN2020/089834, filed on May 12, 2020.

(51) Int. Cl.
*G06F 3/038* (2013.01)
*G06F 3/0354* (2013.01)
(Continued)

(52) U.S. Cl.
CPC ........ *G06F 3/0383* (2013.01); *G06F 3/03545* (2013.01); *G06F 3/041* (2013.01);
(Continued)

(58) Field of Classification Search
CPC ............... G06F 3/03545; G06F 3/0383; G06F 3/04162; G06F 3/0416
See application file for complete search history.

(56) References Cited

U.S. PATENT DOCUMENTS

| | | | |
|---|---|---|---|
| 9,851,816 B2* | 12/2017 | Chang | G06F 3/0383 |
| 2014/0062966 A1* | 3/2014 | Szymanski | G06F 3/03545 |
| | | | 345/179 |
| 2016/0162044 A1 | 6/2016 | Ciou et al. | |

FOREIGN PATENT DOCUMENTS

| | | |
|---|---|---|
| CN | 102622104 A | 8/2012 |
| CN | 102902383 A | 1/2013 |

(Continued)

*Primary Examiner* — Koosha Sharifi-Tafreshi
(74) *Attorney, Agent, or Firm* — Scully Scott Murphy & Presser

(57) ABSTRACT

A method and an apparatus for pressure detection, an active pen, a touch control chip and an electrode device are provided, configured to detect a pressure of the active pen on a screen. The active pen includes a pressure sensor, a wireless communication module and a tip electrode, and the pressure sensor is configured to detect the pressure generated by the active pen. The method includes: determining a second pressure level corresponding to the pressure, according to a detection signal corresponding to a first driving signal output by the tip electrode, when a pressure signal of a first pressure level corresponding to the pressure sent by the wireless communication module is not received; and displaying handwriting of the active pen, by the screen, according to the second pressure level. The method can reduce time delay of a response of a first writing of the active pen.

19 Claims, 6 Drawing Sheets

(51) Int. Cl.
*G06F 3/041* (2006.01)
*G06F 3/04883* (2022.01)

(52) U.S. Cl.
CPC ............... *G06F 3/04883* (2013.01); *G06F 2203/04105* (2013.01); *G06F 2203/04106* (2013.01)

(56) References Cited

FOREIGN PATENT DOCUMENTS

| | | | |
|---|---|---|---|
| CN | 206411628 U | 8/2017 |
| CN | 108693985 A | 10/2018 |
| CN | 110832447 A | 2/2020 |
| CN | 111095173 A | 5/2020 |

* cited by examiner

METHOD AND APPARATUS FOR PRESSURE DETECTION, ACTIVE PEN, TOUCH CONTROL CHIP, AND ELECTRONIC DEVICE

CROSS-REFERENCE TO RELATED APPLICATIONS

This application is a continuation of International Application No. PCT/CN2020/089834, filed on May 12, 2020, the disclosure of which is hereby incorporated by reference in its entirety.

TECHNICAL FIELD

Embodiments of the present application relate to the field of information technology, and in particular, to a method and an apparatus for pressure detection, an active pen, a touch control chip, and an electronic device.

BACKGROUND

With the popularization of capacitive screens, the application of a capacitive active pen becomes increasingly widespread. In actual use, the active pen is required to transmit two kinds of information, namely a tip coordinate and a tip pressure, to a screen terminal, so that the screen terminal can implement writing. Time delay of a response of a first writing of the active pen is one of key indicators to measure the performance of the active pen. The faster the first writing responses, the better the followability of the writing is, the smoother the writing becomes, and the better the user experience is. Therefore, how to avoid delayed display of a writing pressure of the active pen on the screen becomes a problem to be solved urgently.

SUMMARY

Embodiments of the present application provides a method and an apparatus for pressure detection, an active pen, a touch control chip and an electronic device, which can avoid the delayed display of a writing pressure of the active pen on the screen.

In a first aspect, a method for pressure detection is provided, configured to detect a pressure of an active pen on a screen, where the active pen includes a pressure sensor, a wireless communication module and a tip electrode, the pressure sensor is configured to detect a pressure generated by the active pen, and the method includes: determining a second pressure level corresponding to the pressure, according to a detection signal corresponding to a first driving signal output by the tip electrode, when a pressure signal of a first pressure level corresponding to the pressure sent by the wireless communication module is not received, where the first pressure level is one of levels of a first quantity, the second pressure level is one of levels of a second quantity, the second quantity is less than the first quantity, and a quantity of coded bits of the first driving signal is less than a quantity of coded bits of the pressure signal; and displaying handwriting of the active pen, by the screen, according to the second pressure level.

In a possible implementation manner, the method further includes: displaying the handwriting of the active pen, by the screen, according to the first pressure level when the pressure signal is received.

In a possible implementation manner, the method further includes: displaying the handwriting of the active pen, by the screen, according to the first pressure level, when the pressure signal is received and the first driving signal is detected at the same time.

In a possible implementation manner, the quantity of coded bits of the first driving signal is less than or equal to 4.

In a possible implementation manner, an encoding mode of the first driving signal includes any one of frequency modulation coding, phase modulation coding, and amplitude modulation coding.

In a possible implementation manner, where the method further includes: determining a location of the active pen on the screen, according to a detection signal corresponding to a second driving signal output by the tip electrode; where the displaying the handwriting of the active pen, by the screen, according to the second pressure level, includes: displaying the handwriting of the active pen, by the screen, according to the location of the active pen on the screen, and the second pressure level.

In a possible implementation manner, the wireless communication module is a Bluetooth Low Energy (BLE) module.

In a second aspect, an apparatus for pressure detection is provided, configured to detect a pressure of an active pen on a screen, where the active pen includes a pressure sensor, a wireless communication module and a tip electrode, the pressure sensor is configured to detect a pressure generated by the active pen, and the apparatus includes: a processing module, configured to determine a second pressure level corresponding to the pressure, according to a detection signal corresponding to a first driving signal output by the tip electrode, when a pressure signal of a first pressure level corresponding to the pressure sent by the wireless communication module is not received, where the first pressure level is one of levels of a first quantity, the second pressure level is one of levels of a second quantity, the second quantity is less than the first quantity, and a quantity of coded bits of the first driving signal is less than a quantity of coded bits of the pressure signal; and a control module, configured to display handwriting of the active pen, by the screen, according to the second pressure level.

In a possible implementation manner, the control module is further configured to: display the handwriting of the active pen, by the screen, according to the first pressure level when the pressure signal is received.

In a possible implementation manner, the control module is further configured to: display the handwriting of the active pen, by the screen, according to the first pressure level when the pressure signal is received and the first driving signal is detected at the same time.

In a possible implementation manner, the quantity of coded bits of the first driving signal is less than or equal to 4.

In a possible implementation manner, an encoding mode of the first driving signal includes any one of frequency modulation coding, phase modulation coding, and amplitude modulation coding.

In a possible implementation manner, the processing module is further configured to: determine a location of the active pen on the screen, according to a detection signal corresponding to a second driving signal output by the tip electrode; where the control module is further configured to: display the handwriting of the active pen, by the screen, according to the location of the active pen on the screen and the second pressure level.

In a possible implementation manner, the wireless communication module is a BLE module.

In a third aspect, an active pen is provided, including: a pressure sensor, configured to detect a pressure generated by an active pen; a tip electrode, configured to output a first driving signal, where the first driving signal is configured to indicate a second pressure level corresponding to the pressure; and a wireless communication module, configured to transmit a pressure signal of a first pressure level corresponding to the pressure, where the first pressure level is one of levels of a first quantity, the second pressure level is one of levels of a second quantity, the second quantity is less than the first quantity, and a quantity of coded bits of the first driving signal is less than a quantity of coded bits of the pressure signal.

In a possible implementation manner, the quantity of coded bits of the first driving signal is less than or equal to 4.

In a possible implementation manner, an encoding mode of the first driving signal includes any one of frequency modulation coding, phase modulation coding, and amplitude modulation coding.

In a possible implementation manner, the tip electrode is further configured to output a second driving signal, and a detection signal of the second driving signal is configured to determine a location of the active pen on the screen.

In a possible implementation manner, the wireless communication module is a BLE module.

In a fourth aspect, a touch control chip is provided, including the apparatus for pressure detection in the second aspect and any possible implementation manners of the second aspect.

In a fifth aspect, an electronic device is provided, including: the apparatus for pressure detection in the second aspect and any possible implementation manners of the second aspect; and a screen.

In a sixth aspect, a system for pressure detection, including the electronic device in the fifth aspect or any possible implementation manners of the fifth aspect; and the active pen in the third aspect or any possible implementation manners of the third aspect.

Based on the above technical solution, the active pen transmits pressure information of the active pen to the screen at the same time through the driving signal output by the tip electrode and the wireless communication module, where the wireless communication module sends the pressure signal of the first pressure level corresponding to a tip pressure, and the tip electrode transmits the second pressure level corresponding to the tip pressure to the screen using a short-coded first driving signal. Since the short-coded first driving signal can be quickly demodulated by the screen and a corresponding pressure level information is obtained. Thus, the second pressure level corresponding to the tip pressure can be obtained in time according to the short-coded driving signal, when the pressure signal of the first pressure level transmitted by the wireless communication module is not received by the screen, and the screen responds to the writing of the active pen based on the second pressure level, which can avoid the delayed display of the writing pressure of the active pen on the screen, and ensure user experience.

DESCRIPTION OF EMBODIMENTS

The following describes technical solutions in the present application with reference to accompanying drawings.

Figure 1:
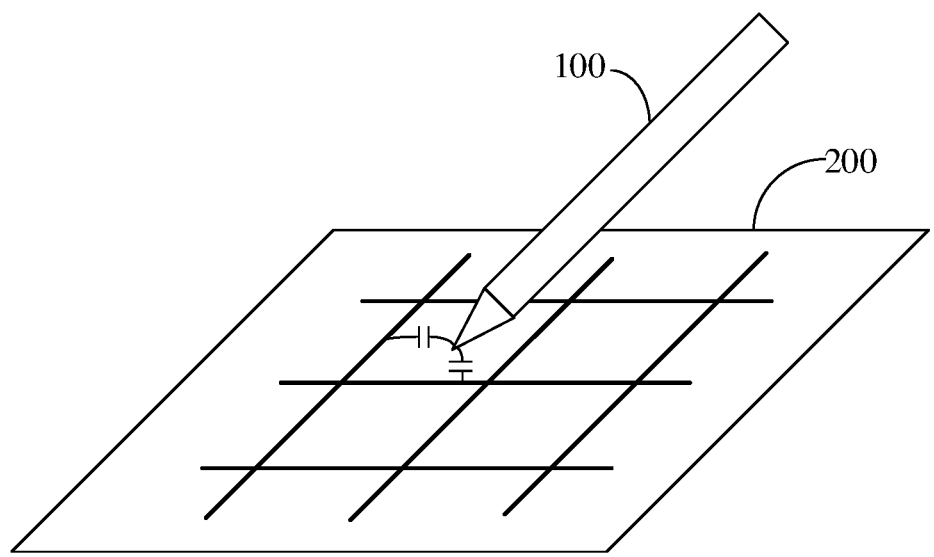
FIG. 1 is a schematic diagram of a principle of using an active pen on a touch screen.

In actual use, an active pen is required to transmit two kinds of information, namely tip coordinate and tip pressure, to a screen terminal, and the screen terminal displays handwriting of the active pen according to the tip coordinate and the tip pressure. For example, as shown in FIG. 1, a certain number of horizontal and vertical detection electrodes are distributed on a screen 200, and if a driving signal output by a tip electrode of the active pen 100 acts at a certain position of the screen 200, detection electrodes of both a horizontal direction and a vertical direction corresponding to the position generate corresponding detection signals, so that a two-dimensional position coordinate of the active pen 100 on the screen 200 may be calculated according to the detection signals. A pressure sensor is also connected to the tip electrode. The pressure sensor is configured to detect the pressure generated by the active pen 100 on the screen 200, which enables the active pen 100 to sense changes of writing strength of a user, and makes the screen 200 change a thickness of the handwriting according to the changes of the writing strength, so as to achieve a superior user experience.

It should be understood that the pressure generated by the active pen described in embodiments of the present application is the pressure output by the user through the active pen, namely, writing pressure of the user. The user can apply pressure to a touch screen through the active pen. According to different pressure, the touch screen can display different handwriting of the active pen, for example, a magnitude of the pressure of the active pen is related to a thickness of the handwriting displayed on the screen. And the pressure may be detected by the pressure sensor in the active pen.

At present, a refresh rate and a time delay of the tip coordinate of the active pen can reach a better effect, for example, the refresh rate of the tip coordinate of the active pen can reach 360 Hz, and a transmission delay of the information of the tip coordinate is also relatively short, only 2.78 ms. However, transmission efficiency of the information of the tip pressure of the active pen is relatively low. Generally, the refresh rate of the pressure information is only 60 Hz, and the transmission delay of the pressure information is relatively long, which is 16 ms. This results in the delay of displaying of first writing of the active pen to be greater than 16 ms. Therefore, the transmission delay of the pressure information becomes a key factor that affects a first response of the active pen.

At present, there are two ways to transmit the information of the tip pressure of the active pen. On way is to transmit the pressure information by sending the driving signal through the tip electrode of the active pen, and the other way is to transmit the pressure information wirelessly through the wireless communication module in the active pen.

The driving signal may also be referred to as a drive signal, an excitation signal, etc., and is an electrical signal emitted by the tip electrode of the active pen for determining a position of the tip of the active pen.

For the first way, the tip electrode of the active pen can emit one or more segments of the driving signal that are encoded according to a predetermined rule or format. The driving signal is coupled to the screen through a capacitor between the tip electrode of the active pen and the detection electrode of the screen, the screen then demodulates and restores the information of the tip pressure carried in the driving signal according to a signal encoding format agreed in a protocol, and finally reports to an operating system to perform related operations. The active pen and the screen can agree to use, for example, the frequency coding of the Microsoft Pen Protocol (MPP) protocol, and the phase coding of Binary Phase Shift Keying (BPSK) of the Universal Stylus Initiative (USI) protocol, and amplitude encoding of other protocols to encode and decode the pressure information.

For the second way, a wireless communication module is provided in the active pen when the information of the tip pressure is transmitted by wireless communication technology. Before using the active pen, a wireless connection is established between the active pen and a wireless communication module of a mobile phone or computer, and the pressure information detected by the active pen is directly transmitted to the operating system of the screen terminal through wireless communication.

However, both of these two ways have obvious shortcomings.

In the first way, the active pen needs to encode the pressure information, and send the encoded pressure information to the screen through the tip electrode. Thus, after the screen terminal detects the driving signal transmitted by the active pen, the screen terminal needs to sample and decode the signal to obtain the pressure information carried in the driving signal. Currently, the tip pressure of the active pen is divided into 4096 levels, which need to be represented by 12 to 21 bits. For example, as shown in Table 1, the first pressure level is represented by a value of bit (bit) 0 to bit 11, and the first pressure level may be one of level 0 to level 4095. Here, it is assumed that the pressure represented by level 0 to level 4095 increases sequentially. It takes more time for the screen to sample and decode the signal with longer bits, usually more than 2 ms. This severely affects the detection of the screen to the tip coordinate and the tip pressure, resulting in a reduced report rate of the tip coordinate and the tip pressure.

TABLE 1

| First Driving Signal | | | | | | | | | | | |
|---|---|---|---|---|---|---|---|---|---|---|---|
| bit 11 | bit 10 | bit 9 | bit 8 | bit 7 | bit 6 | bit 5 | bit 4 | bit 3 | bit 2 | bit 1 | bit 0 |
| First Pressure Level 0-4095 | | | | | | | | | | | |

Figure 2:
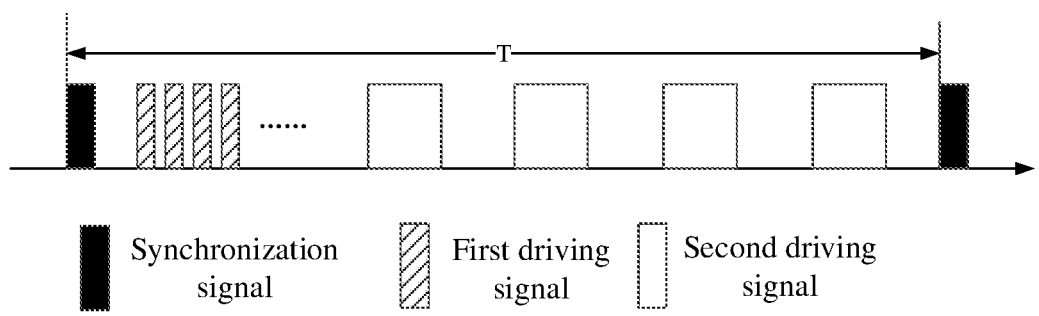
FIG. 2 is a schematic diagram of pressure information and coordinate information transmitted by an active pen through a driving signal.

For example, as shown in FIG. 2, in a detection period T of the screen, after the screen detects an indicating signal (Beacon signal), or referred as a synchronization signal, the screen starts to detect the first driving signal emitted by the tip electrode of the active pen, the first driving signal is configured to indicate the pressure level corresponding to the pressure detected by the pressure sensor of the active pen, for example, one of level 0 to level 4096 shown in Table 1. Then, the screen detects the second driving signal emitted by the tip electrode of the active pen, and the second driving signal is configured to determine the position coordinates of the active pen. Here, generally, the detection period T is 16 ms, and the active pen needs to transmit the Beacon signal, the first driving signal, and the second driving signal in the period T. For the first driving signal, it takes 200 us to number each bit, so it takes at least 2.8 ms to transmit a 12-bit pressure information and a 2-bit parity bit. Transmission time of the first driving signal is too long, resulting in only one first driving signal and four second driving signals being transmitted in period T, and the screen terminal can only obtain one pressure information and four position coordinates in each detection period T. This severely limits the detection of the tip coordinate and the tip pressure, making it difficult to improve the refresh rate of the tip coordinate and the tip pressure.

However, in the second way, due to the multi-layer encapsulation of the protocol stack in the wireless communication protocol and the multi-task scheduling of the operating system, transmission of the pressure information is not timely, and the delay time is uncontrollable. This leads to a slow response of the first writing of the active pen and affects the user's writing experience.

Therefore, the present application provides a method for pressure detection, which can avoid the delayed display of the writing pressure generated by the active pen on the screen.

Figure 3:
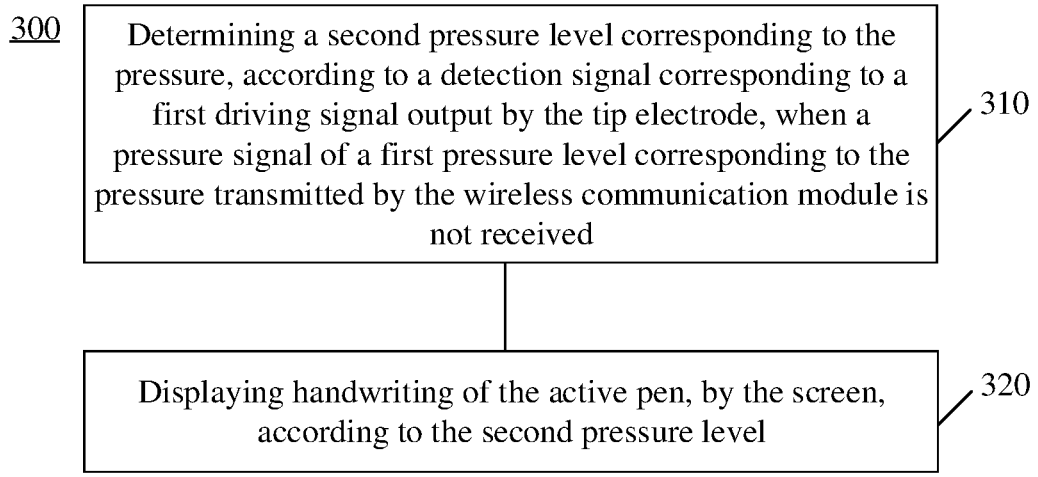
FIG. 3 is a schematic flowchart of a method for pressure detection according to an embodiment of the present application.

FIG. 3 is a schematic flowchart of a method for pressure detection in an embodiment of the present application. A method 300 shown in FIG. 3 may be performed by the apparatus for pressure detection, and the apparatus, for example, may be a touch control chip or a touch controller of a screen, or a processor or an operating system of an electronic device.

The method 300 is configured to detect a pressure of an active pen on a screen, the active pen includes a pressure sensor, a wireless communication module and a tip electrode, the pressure sensor is configured to detect the pressure generated by the active pen, as shown in FIG. 3, the method for pressure detection 300 includes some or all of the following steps.

In 310, determine a second pressure level corresponding to the pressure, according to a detection signal corresponding to a first driving signal output by the tip electrode, when a pressure signal of a first pressure level corresponding to the pressure sent by the wireless communication module is not received.

Here, the first pressure level is one of levels of a first quantity, the second pressure level is one of levels of a second quantity, the second quantity is less than the first quantity, and a quantity of coded bits of the first driving signal is less than a quantity of coded bits of the pressure signal.

It can be understood that, in contrast, the first driving signal output by the tip electrode of the active pen is a short-coded signal, and the pressure signal sent by the wireless communication module of the active pen is a long-coded signal, so maximum quantities of the pressure levels that can be represented by the pressure signal and the first driving signal are different.

In 320, display handwriting of the active pen, by the screen, according to the second pressure level.

In the present embodiment, the active pen transmits the pressure information of the active pen to the screen at the same time, through the driving signal output by the tip electrode and the wireless communication module. Here, the wireless communication module sends a pressure signal of the first driving signal corresponding to the tip pressure, and the tip electrode uses a short-coded first driving signal to transmit the second pressure level corresponding to the tip pressure to the screen. Since the short-coded first driving signal can be quickly demodulated by the screen and the corresponding pressure level information can be obtained, when the screen does not receive the pressure signal of the first pressure level transmitted by the wireless communication module, the second pressure level of the tip pressure can be obtained in time according to the short-coded first driving signal, and the writing of the active pen is responded based on the second pressure level.

When the active pen sends a pressure signal through the wireless communication module and at the same time emits the first driving signal through the tip electrode to the screen, since the first driving signal is formed by short encoding, the first driving signal can be transmitted for a plurality of times in one detection period, and the decoding time of the screen for each first driving signal is also greatly shortened, which enables the screen to quickly obtain the pressure information of the active pen through the first driving signal, display the corresponding handwriting in time, and avoid the delayed display of the writing pressure of the active pen on the screen when the screen does not detect the pressure signal sent by the wireless communication module.

At this time, since the quantity of the coded bits of the first driving signal is less than the quantity of the coded bits of the pressure signal, the resolution of the second pressure level and the first pressure level are different. The first pressure level is one of the levels of the first quantity, the second pressure level is one of the levels of the second quantity, and the second quantity is less than the first quantity.

In other words, in contrast, the first pressure level is a finely divided pressure level, and the second pressure level is a roughly divided pressure level.

The wireless communication module may be, for example, a BLE module, a WiFi module, or the like.

The quantity of the coded bits of the first driving signal can be set according to actual conditions, for example, the quantity of the coded bits of the first driving signal may be less than or equal to 4. An encoding mode of the first driving signal may be any one of frequency modulation coding, phase modulation coding, and amplitude modulation coding.

For example, as shown in Table 2, the quantity of coded bits of the first driving signal is 4, and the value of bit 0 to bit 3 is used to indicate level 0 to level 15. The second pressure level may be one of level 0 to level 15. Here, it is assumed that the pressure represented by level 0 to level 15 increases sequentially. Compared with Table 1, the quantity of coded bits of the first driving signal is reduced from 12 bits to 4 bits, and the quantity of represented pressure levels is reduced. The first driving signal shown in Table 2 may represent 16 pressure levels.

TABLE 2

| | First Driving Signal | | |
|---|---|---|---|
| bit 3 | bit 2 | bit 1 | bit 0 |
| | Second Pressure Level 0~15 | | |

The dividing method of the second pressure levels is not limited in the present application. Different first pressure levels can correspond to different thicknesses of the handwriting, and different second pressure levels can also correspond to different thicknesses of the handwriting.

Considering that the pressure of the first writing of the active pen is usually not great, thus the second pressure level can correspond to a lower pressure. For example, 16 pressure levels in Table 2 may correspond to levels 0 to 15 of the 4096 pressure levels in Table 1.

The second pressure level can also be a rough division of the first pressure level. For example, the level 0 to level 255 in Table 1 can be equally divided into 16 parts, which respectively correspond to the 16 pressure levels in Table 2. For another example, the 4096 pressure levels in Table 1 can be equally divided into 16 parts, which respectively correspond to the 16 pressure levels in Table 2.

In this way, when the pressure signal of the first pressure level corresponding to the pressure sent by the wireless communication module in the active pen is not received, the second pressure level corresponding to the pressure can be determined according to the detection signal corresponding to the first driving signal output by the tip electrode of the active pen, and the handwriting of the active pen is displayed on the screen according to the second pressure level.

Of course, a minimum quantity of the coded bits of the first driving signal can be 1. At this time, the second pressure level can only include the two levels—with pressure and without pressure, that is, the first driving signal of 1 bit indicates whether the active pen generates pressure. If it is determined that the active pen generates pressure, the screen can display the handwriting of the active pen based on a predetermined pressure value. If it is determined that the active pen does not generate pressure, it will not be displayed. Since the pressure of the first writing of the active pen is relatively small, the predetermined pressure value may be relatively small.

In an implementation manner, the method 300 further includes: displaying the handwriting of the active pen according to the first pressure level, when the pressure signal is received.

In an implementation manner, the method 300 further includes: displaying the handwriting of the active pen, by the screen, according to the first pressure level, when the pressure signal is received and the first driving signal is detected at the same time.

In other words, as long as the screen obtains any one of the first pressure level and the second pressure level, the handwriting of the active pen can be displayed according to the pressure level obtained first. And if the first pressure level and the second pressure level are received at the same time, the handwriting of the active pen is displayed according to the first pressure level.

In an implementation manner, the method 300 further includes: determining the location of the active pen on the screen according to the detection signal corresponding to the second driving signal output by the tip electrode; where, in 320, displaying the handwriting of the active pen, by the screen, according to the location of the active pen on the screen and the second pressure level.

Figure 4:
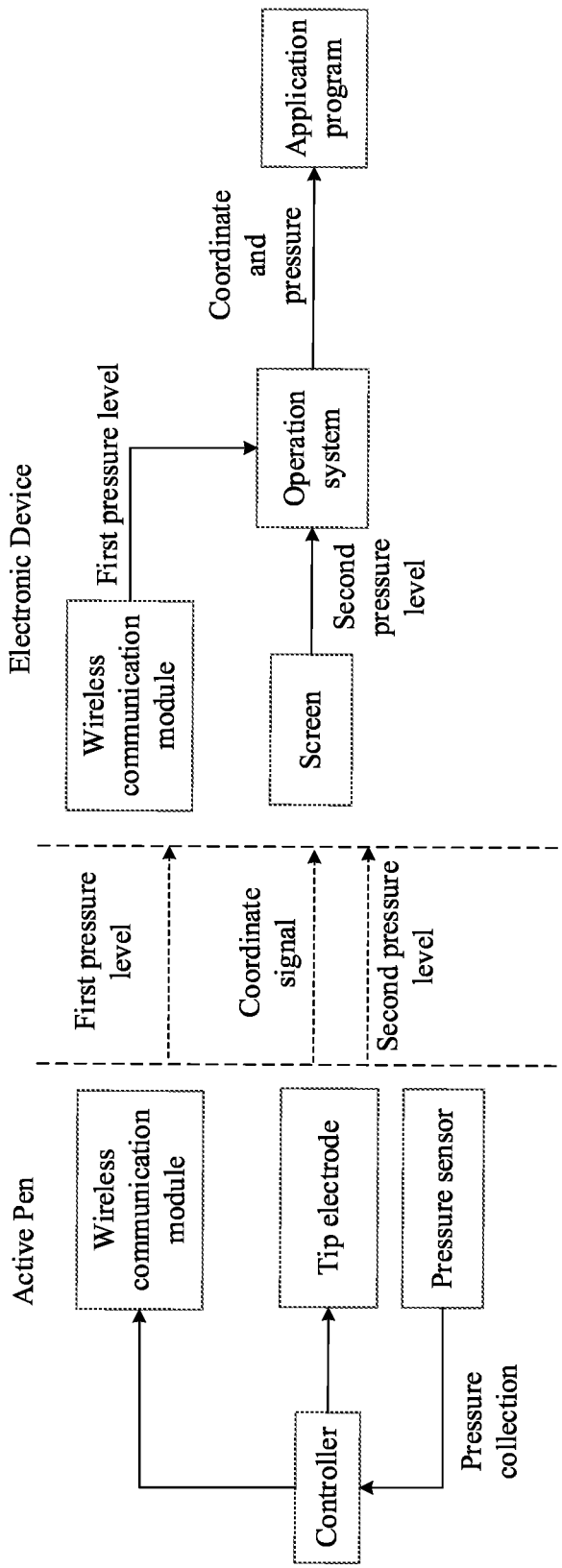
FIG. 4 is a schematic diagram of information interaction between an active pen and an electronic device.

FIG. 4 shows the interaction between the active pen and the screen. A controller in the active pen controls the pressure sensor to collect the pressure of the active pen, controls the wireless communication module to transmit the pressure signal of the first pressure level, and controls the tip electrode to emit the first driving signal and the second driving signal to respectively transmit the information of the second pressure level corresponding to the pressure and the location coordinates. Accordingly, the wireless communication module of the electronic device receives the pressure signal and obtains the first pressure level and sends information of the first pressure level to the operating system of the electronic device, the screen of the electronic device detects the first driving signal and the second driving signal, decodes them, and sends them to the operating system, the operating system selects the pressure level to be displayed based on the foregoing method and informs the application program with the pressure level and the coordinate information, so that the application program displays the handwriting of the active pen through the screen.

The detection sequence of the above first pressure level and the second pressure level will be described in detail below with reference to FIGS. 5 and 6. It should be understood that the detection sequence of each signal in a detection period T shown in FIG. 5 is merely an example, and is not limited in the embodiment of the present application.

Figure 5:
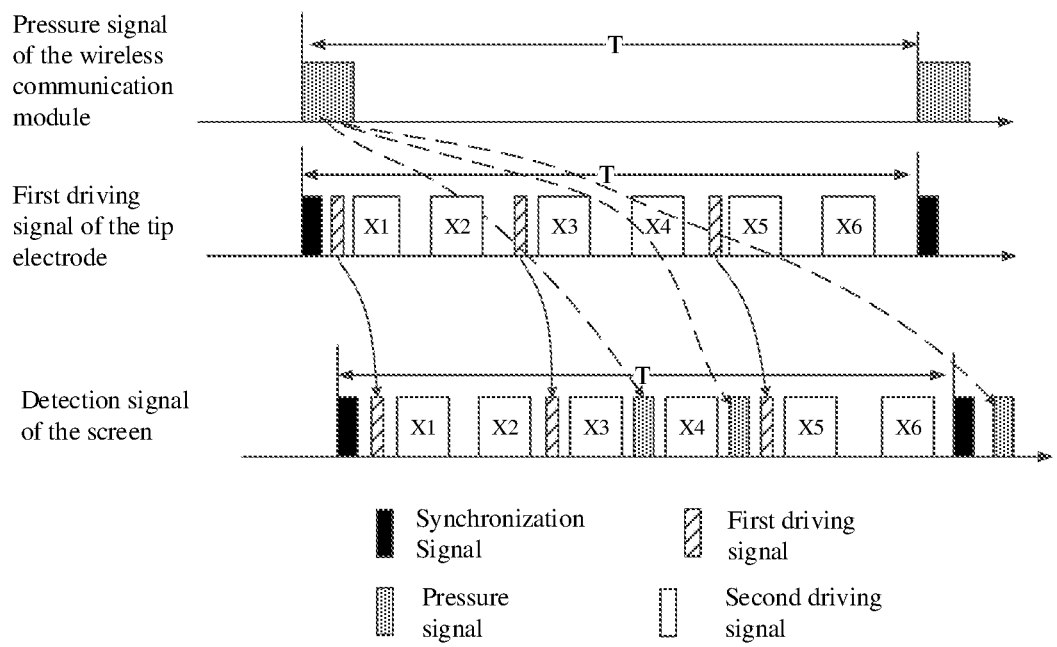
FIG. 5 is a schematic diagram of a possible implementation manner of the method shown in FIG. 3.
Figure 6:
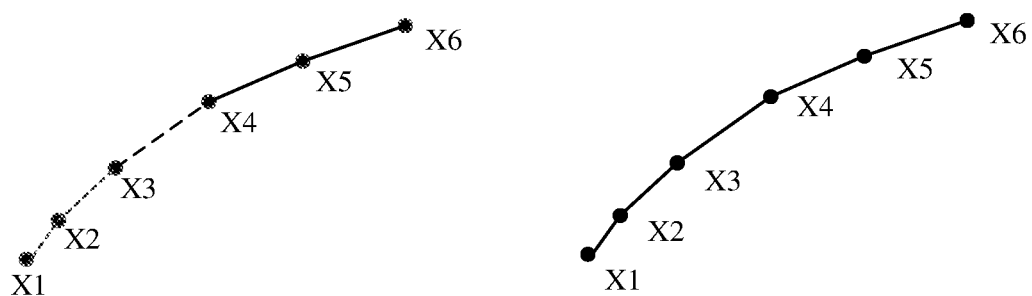
FIG. 6 is a schematic diagram of handwriting of an active pen obtained based on the method shown in FIG. 5.

As shown in FIG. 5, the screen detects the second driving signal in real time within a detection period T, and obtains five coordinate signals X1 to X6 according to the second driving signal. As shown in the first row of FIG. 5, due to the uncertainty of the time delay of the wireless communication, when the active pen transmits the pressure signal of the first pressure level corresponding to the tip pressure through the wireless communication module, the screen possibly obtains the first pressure signal in the current period, or possibly obtains the first pressure level in the next period. As shown in the third row of FIG. 5, the screen obtains the first pressure level until it at the position before detecting the coordinate X4 or the coordinate X5. In this time, as shown on the left side of FIG. 6, if the active pen only sends the pressure signal of the first pressure level through the wireless communication module, the handwriting of the active pen displayed on the screen will start from the coordinate X4, and there is not corresponding pressure level for the coordinates X1 to X3 and can only be displayed as hovering coordinates, and these points on the handwriting are omitted and cannot be displayed.

As shown in the second row of FIG. 5, when the active pen transmits the second pressure level corresponding to the tip pressure through the first driving signal because the short encoding is adopted, the second pressure level can be transmitted a plurality of times within one detection period T. In FIG. 5, taking the first driving signal transmitted three times in a detection period T as an example, and the time sequence of emission and detection of the first driving signal and the second driving signal can be agreed between the active pen and the screen. It can be seen that the first driving signal can be detected before the coordinate X1, before the coordinate X3, and before the coordinate X5. Therefore, as shown at the right side of FIG. 6, the screen can display the handwriting of the active pen starting from the first coordinate X1.

Specifically, only the first driving signal is detected before the coordinate X3, thus the screen displays the handwriting of the active pen according to the second pressure level at the coordinates X1 to X3; the pressure signal of the first pressure level transmitted by the wireless communication module is detected before the coordinate X4, thus the screen displays the handwriting of the active pen according to the second pressure level at the coordinate X4; the pressure signal of the first pressure level and the first driving signal transmitted by the wireless communication module are detected at the same time before the coordinate X5, thus the screen displays the handwriting of the active pen at the coordinates X5 and X6 according to the first pressure level.

It should be understood that the detection period shown in FIG. 5 may be the detection period of the first writing of the active pen. Here, "the first writing" refers to the first stroke that is written by the active pen on the screen, for example, an initial handwriting in a continuous handwriting written on the screen by the user. At this time, in the subsequent detection period, since the screen has begun to receive the pressure signal transmitted by the wireless communication module, the active pen can no longer send the first driving signal, but only send the second driving signal to improve the refresh rate of the tip coordinate of the active pen. Or, in all or some of the subsequent period, in order to avoid instability in the signal transmission of the wireless communication module, it is still available to use the same method as in the detection period of the first writing of the active pen, i.e. the active pen not only sends the first driving signal by the tip electrode, but uses the wireless communication module to send the pressure signal. This is not limited in the embodiment of the present application.

Figure 7:
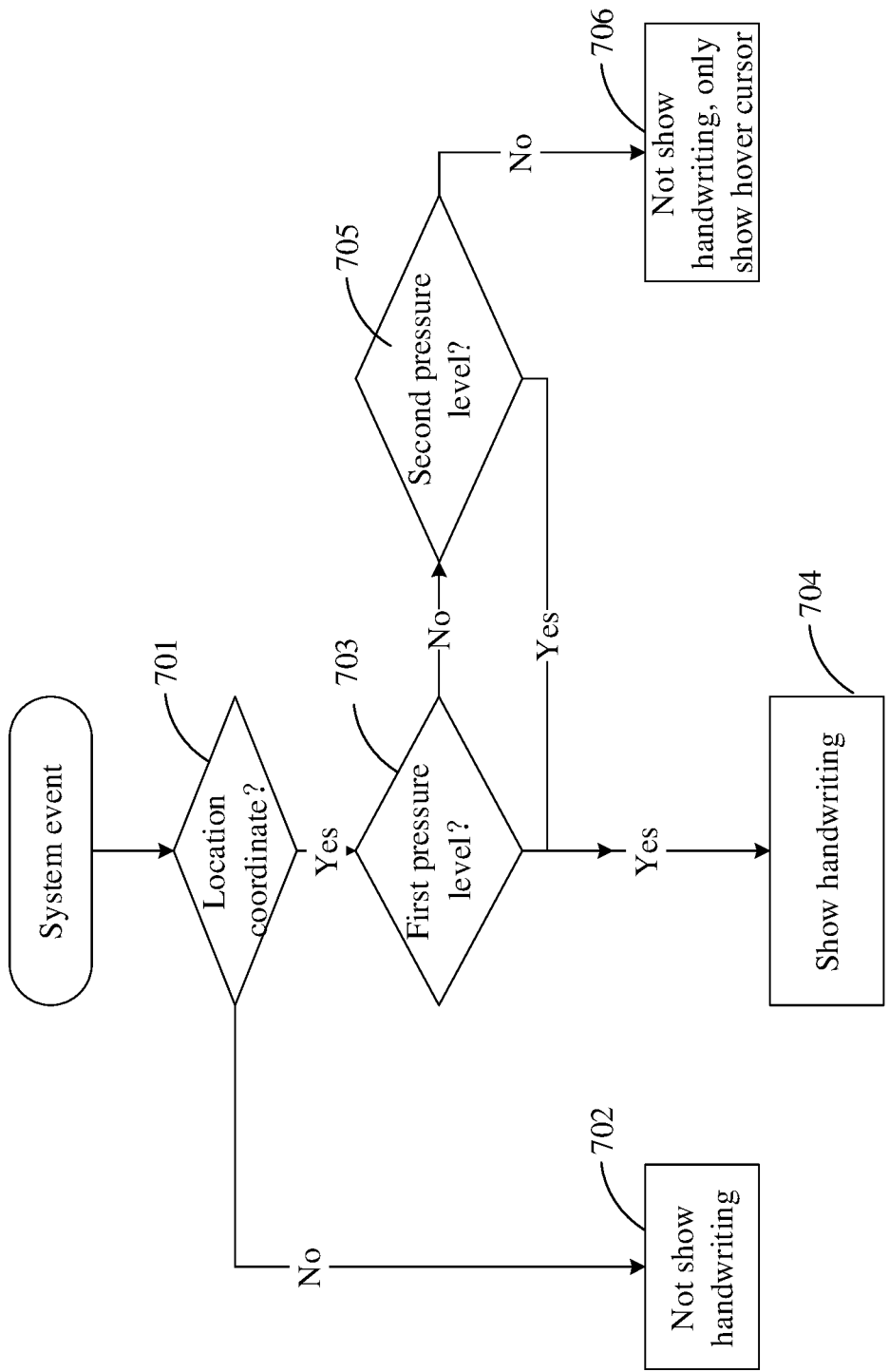
FIG. 7 is a schematic flowchart of displaying handwriting of an active pen based on the method shown in FIG. 5.

Taking FIG. 5 as an example, in the process of controlling the screen to display the handwriting of the active pen, for example, the process shown in FIG. 7 may be executed.

In 701, determine whether to obtain the position coordinates of the active pen.

Here, if the position coordinates of the active pen are not obtained, execute 702; if the position coordinates of the active pen are obtained, execute 703.

In 702, control the screen not to display the handwriting of the active pen.

In 703, determine whether to obtain the first pressure level corresponding to the pressure of the active pen.

Here, if the first pressure level is obtained, execute 704; if the first pressure level is not obtained, execute 705.

In 704, control the screen to display the handwriting of the active pen.

At this time, in 704, the screen is controlled to display the corresponding handwriting according to the first pressure level.

In 705, determine whether to obtain the second pressure level corresponding to the pressure of the active pen.

Here, if the second pressure level is not obtained, execute 706; if the second pressure level is obtained, execute 704.

At this time, in 704, the screen is controlled to display the corresponding handwriting according to the second pressure level.

In 706, control the screen not to display the handwriting of the active pen, only display the hover cursor.

It can be seen that the active pen transmits the wireless signal of the tip pressure through the wireless communication module, and at the same time transmits the short-coded signal corresponding to the tip pressure through the first driving signal. This method not only solves the problem of the decrease in the refresh rate of the tip coordinate caused by the long transmission time of the tip pressure, but also is capable of transmitting the pressure of the active pen to the screen in time, which make up for the shortcomings of the long signal transmission delay of the wireless communication module, speed up the first writing response of the active pen, and improve the fluency of the writing of the user.

Figure 8:
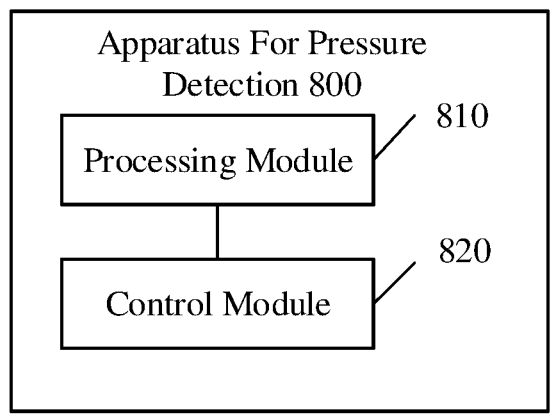
FIG. 8 is a schematic block diagram of an apparatus for pressure detection according to an embodiment of the present application.

The present application further provides an apparatus for pressure detection. The apparatus is configured to detect a pressure of an active pen on a screen, where the active pen includes a pressure sensor, a wireless communication module, and a tip electrode, and the pressure sensor is configured to detect the pressure generated by the active pen. Specifically, the apparatus can execute any possible methods in the foregoing FIG. 3 to FIG. 7. As shown in FIG. 8, the apparatus 800 includes: a processing module 810, configured to determine a second pressure level corresponding to the pressure, according to a detection signal corresponding to a first driving signal output by the tip electrode, when a pressure signal of a first pressure level corresponding to the pressure, that is sent by the wireless communication module, is not received, where the first pressure level is one of levels of a first quantity, the second pressure level is one of levels of a second quantity, the second quantity is less than the first quantity, and a quantity of coded bits of the first driving signal is less than a quantity of coded bits of the pressure signal; and a control module 820, configured to display handwriting of the active pen, by the screen, according to the second pressure level.

In an implementation manner, the control module 820 is further configured to: display the handwriting of the active pen on the screen according to the first pressure level, when the pressure signal is received.

In an implementation manner, the control module 820 is further configured to: display the handwriting of the active pen, by the screen, according to the first pressure level, when the pressure signal is received and the first driving signal is detected at the same time.

In an implementation manner, the quantity of coded bits of the first driving signal is less than or equal to 4.

In an implementation manner, an encoding mode of the first driving signal includes any one of frequency modulation coding, phase modulation coding, and amplitude modulation coding.

In an implementation manner, the processing module 810 further configured to: determine a location of the active pen on the screen, according to a detection signal corresponding to a second driving signal output by the tip electrode; where the control module 820 is further configured to: display the handwriting of the active pen, by the screen, according to the location of the active pen on the screen, and the second pressure level.

In an implementation manner, the wireless communication module is a BLE module.

The present application further provides an apparatus for pressure detection. The apparatus includes a memory and a processor, where the memory is configured to store instructions, and the processor is configured to read instructions stored in the memory and perform the method in any embodiment of the present application according to the instructions.

Figure 9:
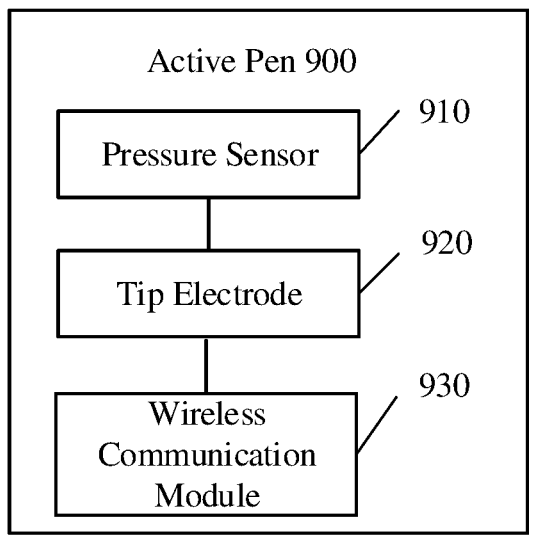
FIG. 9 is a schematic block diagram of an active pen according to an embodiment of the present application.

The present application further provides an active pen, the active pen can perform the operations performed by the active pen in the foregoing method embodiments. As shown in FIG. 9, an active pen 900 includes: a pressure sensor 910, configured to detect a pressure generated by the active pen; a tip electrode 920, configured to output a first driving signal, where the first driving signal is configured to indicate a second pressure level corresponding to the pressure; and a wireless communication module 930, configured to transmit a pressure signal of a pressure level corresponding to the pressure, where the first pressure level is one of levels of a first quantity, the second pressure level is one of levels of a second quantity, the second quantity is less than the first quantity, and a quantity of coded bits of the first driving signal is less than a quantity of coded bits of the pressure signal.

In an implementation manner, the quantity of coded bits of the first driving signal is less than or equal to 4.

In an implementation manner, an encoding mode of the first driving signal includes any one of frequency modulation coding, phase modulation coding, and amplitude modulation coding.

In an implementation manner, the tip electrode 920 further configured to output a second driving signal, and a detection signal of the second driving signal is configured to determine a location of the active pen on the screen.

In an implementation manner, a wireless communication module 930 is a BLE module.

The present application further provides a screen, the screen can perform operations performed by the screen in foregoing method embodiments.

The present application further provides a touch control chip, and the touch control chip may include the apparatus 800 for pressure detection shown in FIG. 8.

The present application further provides an electronic device, and the electronic device may include the apparatus 800 for pressure detection shown in FIG. 8, and the screen in any embodiment of the present application.

The present application further provides a system for pressure detection, including the electronic device in the embodiment of the present application and the active pen shown in FIG. 9.

It should be noted that, under a premise of no conflict, various embodiments and/or technical features in the various embodiments described in the present application may be combined with each other arbitrarily, and the technical solutions obtained after the combination should also fall within the protection scope of the present application.

The system, apparatus, and method disclosed in the embodiments of the present application may be implemented in other manners. For example, some features of the method embodiments described above may be ignored or not implemented. The described apparatus embodiment is merely an example. The division of units is merely logical function division and may be other division during actual implementation. The plurality of units or components may be combined or integrated into another system. In addition, the coupling between various units or the coupling between various components may be direct coupling or indirect coupling, and the above coupling includes electrical, mechanical or other forms of connection.

It may be clearly understood by those skilled in the art that, for ease and brief description, for a detailed working process of the foregoing apparatus and device and the generated technical effect, a corresponding process and technical effect in the foregoing method embodiments may be referred to, and details are not described herein again.

It should be understood that the specific examples in the embodiments of the present application are only to help those skilled in the art to better understand the embodiments of the present application, but not to limit the scope of the embodiments of the present application. Various modifications and variations which fall within the scope of the present application can be made by those skilled in the art based on the foregoing embodiments.

The foregoing descriptions are merely specific implementation manners of the present application. However, the protection scope of the present application is not limited thereto, and those skilled in the art who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A method for pressure detection, configured to detect a pressure of an active pen on a screen, wherein the active pen comprises a pressure sensor, a wireless communication module and a tip electrode, the pressure sensor is configured to detect a pressure generated by the active pen, and the method comprises:

determining a second pressure level corresponding to the pressure, according to a detection signal corresponding to a first driving signal output by the tip electrode, when a pressure signal of a first pressure level corresponding to the pressure sent by the wireless communication module is not received, wherein the first pressure level is one of levels of a first quantity, the second pressure level is one of levels of a second quantity, the second quantity is less than the first quantity, and a quantity of coded bits of the first driving signal is less than a quantity of coded bits of the pressure signal; and displaying handwriting of the active pen, by the screen, according to the second pressure level.

2. The method according to claim 1, wherein the method further comprises:

displaying the handwriting of the active pen, by the screen, according to the first pressure level when the pressure signal is received.

3. The method according to claim 1, wherein the method further comprises:

displaying the handwriting of the active pen, by the screen, according to the first pressure level, when the pressure signal is received and the first driving signal is detected at the same time.

4. The method according to claim 1, wherein the quantity of coded bits of the first driving signal is less than or equal to 4.

5. The method according to claim 1, wherein an encoding mode of the first driving signal comprises any one of frequency modulation coding, phase modulation coding, and amplitude modulation coding.

6. The method according to claim 1, wherein the method further comprises:

determining a location of the active pen on the screen, according to a detection signal corresponding to a second driving signal output by the tip electrode;

wherein the displaying the handwriting of the active pen, by the screen, according to the second pressure level, comprises:

displaying the handwriting of the active pen, by the screen, according to the location of the active pen on the screen and the second pressure level.

7. The method according to claim 1, wherein the wireless communication module is a Bluetooth Low Energy (BLE) module.

8. An apparatus for pressure detection, configured to detect a pressure of an active pen on a screen, wherein the active pen comprises a pressure sensor, a wireless communication module and a tip electrode, the pressure sensor is configured to detect a pressure generated by the active pen, and the apparatus comprises:

a processing module, configured to determine a second pressure level corresponding to the pressure, according to a detection signal corresponding to a first driving signal output by the tip electrode, when a pressure signal of a first pressure level corresponding to the pressure sent by the wireless communication module is not received, wherein the first pressure level is one of levels of a first quantity, the second pressure level is one of levels of a second quantity, the second quantity is less than the first quantity, and a quantity of coded bits of the first driving signal is less than a quantity of coded bits of the pressure signal; and a control module, configured to display handwriting of the active pen, by the screen, according to the second pressure level.

9. The apparatus according to claim 8, wherein the control module further configured to:

display the handwriting of the active pen, by the screen, according to the first pressure level when the pressure signal is received.

10. The apparatus according to claim 8, wherein the control module is further configured to:

display the handwriting of the active pen, by the screen, according to the first pressure level, when the pressure signal is received and the first driving signal is detected at the same time.

11. The apparatus according to claim 8, wherein the quantity of coded bits of the first driving signal is less than or equal to 4.

12. The apparatus according to claim 8, wherein an encoding mode of the first driving signal comprises any one of frequency modulation coding, phase modulation coding, and amplitude modulation coding.

13. The apparatus according to a claim 8, wherein the processing module is further configured to:

determine a location of the active pen on the screen, according to a detection signal corresponding to a second driving signal output by the tip electrode;

wherein the control module is further configured to:

display the handwriting of the active pen, by the screen, according to the location of the active pen on the screen and the second pressure level.

14. The apparatus according to claim 8, wherein the wireless communication module is a Bluetooth Low Energy (BLE) module.

15. An active pen, comprising:

a pressure sensor, configured to detect a pressure generated by an active pen;

a tip electrode, configured to output a first driving signal, wherein the first driving signal is configured to indicate a second pressure level corresponding to the pressure; and a wireless communication module, configured to transmit a pressure signal of a first pressure level corresponding to the pressure, wherein the first pressure level is one of levels of a first quantity, the second pressure level is one of levels of a second quantity, the second quantity is less than the first quantity, and a quantity of coded bits of the first driving signal is less than a quantity of coded bits of the pressure signal.

16. The active pen according to claim 15, wherein the quantity of coded bits of the first driving signal is less than or equal to 4.

17. The active pen according to claim 15, wherein an encoding mode of the first driving signal comprises any one of frequency modulation coding, phase modulation coding, and amplitude modulation coding.

18. The active pen according to claim 15, wherein the tip electrode is further configured to output a second driving signal, and a detection signal of the second driving signal is configured to determine a location of the active pen on the screen.

19. The active pen according to claim 15, wherein the wireless communication module is a Bluetooth Low Energy (BLE) module.

* * * * *